United States Patent [19]
Greenwood

[11] 3,854,112
[45] Dec. 10, 1974

[54] PIEZORESISTIVE GLASS STRESS TRANSDUCER

[75] Inventor: John Christopher Greenwood, Harlow, England

[73] Assignee: International Standard Electric Corporation, New York, N.Y.

[22] Filed: Dec. 7, 1973

[21] Appl. No.: 422,907

[30] Foreign Application Priority Data
Dec. 19, 1972 Great Britain.................... 58481/72

[52] U.S. Cl................................. 338/47, 252/62.3
[51] Int. Cl............................................. H01c 9/06
[58] Field of Search............... 338/2, 12, 5, 47, 308; 252/62.3 R, 62.9, 62.3, 62.9, 62.3 N; 73/141 A, DIG. 4, 88.5 R, 517 R

[56] References Cited
UNITED STATES PATENTS
3,315,201  4/1967  Werme................................. 338/2
3,542,683  11/1970  Ouchi et al. ....................... 252/62.9

FOREIGN PATENTS OR APPLICATIONS
958,103  5/1964  Great Britain................ 252/62.3 R OTHER PUBLICATIONS
Soviet Physics-Semiconductors; Vol. 5, No. 3, "Some Investigations of the Electrical Properties of Semiconducting Chalcogenide Glasses;" pp. 478–480

"Structure and Electrical Properties of Chalcogenide Glasses" by Booth Phillips and McMillan; pp. 293–302

Primary Examiner—J. V. Truhe
Assistant Examiner—N. D. Herkamp
Attorney, Agent, or Firm—William T. O'Neil

[57] ABSTRACT

A piezoresistive pressure transducer utilizing the piezoresistive property of glass of high gauge fact. These glasses are selected from a group including vanadium phosphate and tungsten phosphate. The device may be fabricated in various forms and sizes including embodiments of very small size, through application of known glass working techniques such as drawing to reduce it to five fiber form.

9 Claims, 3 Drawing Figures

PATENTED DEC 10 1974					3,854,112

PIEZORESISTIVE GLASS STRESS TRANSDUCER

CROSS-REFERENCE TO RELATED CASES

This application is filed with claim for priority under 35USC119, based on application number 58481/72, filed Dec. 19, 1972, in Great Britain.

BACKGROUND OF THE INVENTION

1. Field of the Invention

The invention relates to pressure transducers.

2. Description of the Prior Art

In the prior art pressure transducers have been employed for measurement of mechanical and hydraulic stresses and as the active element in such specialized devices as phonograph pick-ups, key switches, accelerometers, microphones, etc. Wherever mechanical vibration, accelerations or decelerations are to be measured, a cooperating mass element can be arranged to exert a force on the transducer, in accordance with well known relationships.

The invention involves novel structures and results, although devices according to the invention can be produced by known glass working techniques. Such techniques include, for example, cladding, drawing and various heat based glass working methods.

In the patent literature of interest, U.S. Pat. Nos. 3,303,452, 3,458,345, 3,252,321, and 3,121,337 are extant. Those patents are generally exemplary of semiconductor piezoresistive pressure transducers and the like. U.S. Patent Office class 73, subclasses 88.5, 398 and 399; along with class 338, subclasses 2, 3, 4, 5, 6, 47 and 114 are pertinent in respect to the invention.

U.S. Pat. No. Re 25,924 shows a piezoresistive element on a glass substrate. A thin filament semiconductor piezoresistive stress transducer is shown in U.S. Pat. No. 3,350,926, the said filament being encased in another material.

The advantages effected by the present invention and the details of its novel construction will be understood as this description proceeds.

SUMMARY

According to one aspect of the invention, there is provided a piezoresistive transducer in which the transducer element is of piezoresistive glass, for example, of a transition metal oxide glass.

A piezoresistive effect has been demonstrated in elements of a transition metal oxide glass, the element in each case being a small diameter glass thread (0.5 mm diameter for example), with a length of a few mm. Electrical contacts thereto are of painted-on silver paint.

One form of the invention included an element of vanadium phosphate glass with the following composition and characteristics:

| | |
|---|---|
| $V_2O_5$ (is partially reduced approx $V^V:V^{IV}=2:1$) | 75 mole % |
| $P_2O_5$ | 24 mole % |
| $WO_3$ | 1 mole % |

The approximate value of the gauge factor was 20, and the resistivity $3 \times 10^8$ ohms at room temperature (25°C).

In another embodiment, an element of tungsten phosphate glass was used, having the following composition and characteristics:

| | |
|---|---|
| $WO_3$ | 64 mole % |
| $P_2O_5$ | 36 mole % |

The approximate value of the gauge factor was 12, and the resistivity $7 \times 10^9$ ohms at room temperature (25°C).

A piezo resistive effect has also been detected in chalcogenide glass. An element comprising a slice of chalcogenide glass sawn from a boule and having a thickness of 0.5 mm with an electrode spacing of 2 mm (the electrodes again being painted-on silver paint), had the following composition and characteristics:

| | |
|---|---|
| As | 30 mole % |
| Te | 48 mole % |
| Ge | 10 mole % |
| Si | 12 mole % |

The approximate value of the gauge factor was 70, and the resistivity of the same order as the first two examples.

Utilizing a piezoresistive glass, various forms of transducer may be produced by drawing out fibres by glass working techniques.

By varying the formulation, a material may be obtained with a substantially zero temperature coefficient and expansions to match a variety of substrates.

The glass may be drawn into fine threads to make a simple strain gauge which is potentially much cheaper than silicon, the latter being difficult to form into the small cross-sectional areas required for a practical strain guage.

A transducer element having a composite beam structure may be made by drawing out a glass structure made from suitably (thermally) matched electrically insulating glass, e.g., of the window glass type; and piezoresistive glass.

The advantages of a glass structure vis-a-vis the prior art in piezoresistive elements include low cost, ease of manufacture and relative environmental stability.

DESCRIPTION OF THE PREFERRED EMBODIMENTS

Figure 1:
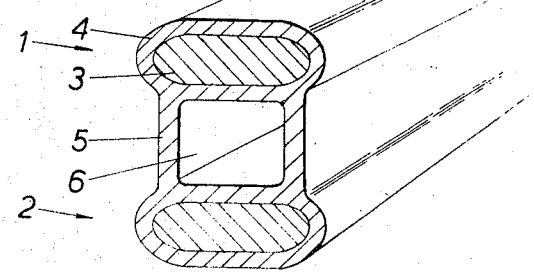
FIG. 1 is a transducer according to the invention employing a hollow core beam structure.

Referring now to FIG. 1 of the accompanying drawings, the first embodiment will be described adopting structural beam terminology. Upper and lower flanges 1 and 2 of the beam each comprise a core 3 of piezoresistive glass surrounded by insulating glass 4. The web 5 of the beam is of insulating glass and hollow throughout its length, being formed with a longitudinal hole 6.

When this structure is subjected to bending stress the two piezoresistive cores 3 are stressed in opposite senses (i.e., one is in tension and the other in compression). Accordingly those elements may be electrically incorporated in opposite arms of a bridge network.

The structure, drawn out to a fine fibre, gives a very small transducer which may be used in such devices as microphones, phonograph pickups, key switches, accelerometers and pressure gauges.

For a fluid pressure gauge, the device of FIG. 1 would be curled and one end closed so that the fluid could be contained from a port at the open end within the hole 6. The curled transducer is thus similar in shape to the well known Bourdon tube used in mechanical fluid pressure tranducers.

As a resonant element, a section of the glass fiber is clamped at one end and the free end allowed to vibrate. The input may be electrostatic: electromagnetic (with the introduction of a suitable magnetic material such as a devitrified barium ferrite glass) or piezoelectric with the introduction of a suitable glass such as a devitrifiable barium titanate.

The necessary associated pair of electrical connection electrodes at the ends of the element may be provided by metalized coatings, etc.

The piezoresistive glass has a relatively high resistivity, typically on the order of $106\Omega$/cm. One type of instrumentation useable in connection with such high resistance elements is the so-called field effect semiconductor amplifier (a semi-conductor device itself).

Figure 2:
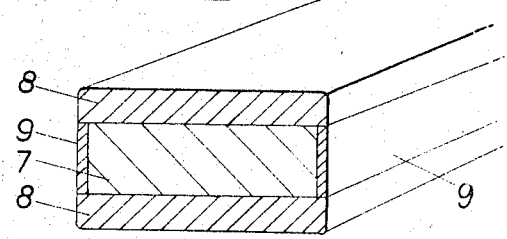
FIG. 2 is a transducer according to the invention employing a strip (sandwich) element configuration.

FIG. 2 of the accompanying drawings shows a strip-shaped pressure responsive element of sandwiched piezoresistive glass 7 with upper and lower layers of electrically insulating glass 8. One method of emplacing electrical conductors 9 on each side face of the piezoresistive glass involves initially providing side layers of a high content metal oxide glass (copper or silver) which can be surface reduced to metallic form of relatively high conductivity after the drawing down.

Figure 3:
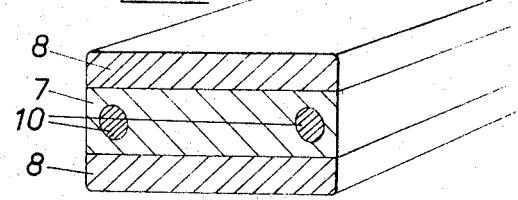
FIG. 3 is a transducer according to the invention employing a sandwich element configuration with a pair of metal cores within the piezoresistive glass.

Alternatively, as shown in FIG. 3 of the accompanying drawings, conductors for collecting transverse current flow and providing connections to the element may be provided by two metal cores 10 (e.g., of tin), each located within the piezoresistive glass adjacent the side faces thereof. The process involves initially using metal cores which are molten when the glass fiber is drawn and which harden into metallic thread thereafter.

It is to be understood that the accompanying drawings and foregoing description of specific structural examples of this invention are presented by way of example only and should not be considered as limiting the scope of the invention.

What is claimed is:

1. A piezoresistive stress transducer comprising:
   an element of piezoresistive glass;
   at least two physically separated electrodes each in contact with at least a portion of said element, thereby providing variations of electrical resistance in said element as a result of application of said stress to said element;
   and means comprising at least a partial housing of insulating glass joined to said element around at least a portion of the surface thereof.

2. Apparatus according to claim 1 in which said piezoresistive glass is a transition metal oxide glass.

3. Apparatus according to claim 1 in which said piezoresistive glass is a chalcogenide glass.

4. Apparatus according to claim 1 in which said piezoresistive glass is selected from a group including vanadium phosphate glass and tungsten phosphate glass.

5. Apparatus according to claim 1 in which said piezoresistive glass is selected from a group including vanadium and tungsten phosphate glasses and chalcogenide glass.

6. Apparatus according to claim 1 in which said element comprises a strip-shaped member of said piezoresistive glass, and said electrodes are emplaced on oppositely about the surface of said element.

7. Apparatus according to claim 1 in which said element comprises a strip-shaped member of said piezoresistive glass, and said electrodes comprise a pair of separated metallic filaments imbedded in said element.

8. Apparatus according to claim 4 in which said element comprises a strip-shaped member of said piezoresistive glass, and said electrodes are emplaced one each on one of an opposite pair of surfaces of said element.

9. Apparatus according to claim 8 in which said strip-shaped member is of generally rectangular cross-section and is elongated along a line normal to the plane of said cross-section, said insulating glass covers substantially only the surfaces corresponding to the larger faces of said rectangular shape, and said electrodes are emplaced one each along a portion of each of the elongated smaller faces of said member.

* * * * *